(12) United States Patent
Kaphengst et al.

(10) Patent No.: US 12,566,429 B2
(45) Date of Patent: Mar. 3, 2026

(54) SYSTEMS AND METHODS FOR CONFIGURING PLANT ASSEMBLY STATIONS

(71) Applicant: GM GLOBAL TECHNOLOGY OPERATIONS LLC, Detroit, MI (US)

(72) Inventors: Michael R Kaphengst, Leonard, MI (US); Alfred Manser, White Lake, MI (US); Seog-Chan Oh, Troy, MI (US); Joshua Lee Solomon, Berkley, MI (US); Ahmad Almarkhi, Farmington Hills, MI (US); Miguel Arturo Saez, Clarkston, MI (US); Kelsey Van Erp, Rochester Hills, MI (US); Xiang Zhao, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 369 days.

(21) Appl. No.: 18/365,086

(22) Filed: Aug. 3, 2023

(65) Prior Publication Data

US 2025/0044780 A1     Feb. 6, 2025

(51) Int. Cl.
*G05B 19/418* (2006.01)

(52) U.S. Cl.
CPC . *G05B 19/41895* (2013.01); *G05B 19/41805* (2013.01)

(58) Field of Classification Search
CPC ........ G05B 19/41895; G05B 19/41805; G05B 19/41845; G05B 19/41885; G05B 17/02; G06F 30/20
See application file for complete search history.

(56) References Cited

U.S. PATENT DOCUMENTS

| | | | |
|---|---|---|---|
| 10,579,071 B1 | 3/2020 | Li et al. | |
| 10,933,933 B2 | 3/2021 | Wells et al. | |
| 11,194,339 B2 | 12/2021 | Zhao et al. | |
| 2019/0266295 A1* | 8/2019 | Masuda | G06Q 50/40 |
| 2020/0265329 A1* | 8/2020 | Thomsen | G06N 20/10 |
| 2021/0394845 A1* | 12/2021 | Thomas | G05D 1/0291 |
| 2021/0397164 A1* | 12/2021 | Thomas | G06F 30/15 |
| 2022/0083926 A1* | 3/2022 | Miller | G05B 19/41885 |
| 2023/0082099 A1* | 3/2023 | Schmidt | G05B 17/02 |
| | | | 700/108 |

(Continued)

FOREIGN PATENT DOCUMENTS

DE     102021208247 A1     2/2023

*Primary Examiner* — Christopher E. Everett
(74) *Attorney, Agent, or Firm* — Ingrassia Fisher & Lorenz, LLP | IF&L

(57) ABSTRACT

Methods and systems are provided for configuring a plant assembly station at a vehicle manufacturing plant. Plant sensor data generated by a plant sensor system is received at a plant assembly configuration system. The plant sensor data is associated with a configuration of a first plant assembly station at a vehicle manufacturing plant. A digital twin of the first plant assembly station is generated based in part on the plant sensor data. A determination is made regarding whether the configuration of the first plant assembly station is in accordance with operational regulations based on a simulation-based assessment of the digital twin of the first plant assembly station. An operability status of the configuration of the first plant assembly station is generated based on the determination.

20 Claims, 5 Drawing Sheets

(56)               References Cited

U.S. PATENT DOCUMENTS

| 2023/0144325 A1* | 5/2023 | Cook .................... G05B 17/02 |
| | | 700/31 |
| 2023/0145508 A1 | 5/2023 | Kaphengst et al. |
| 2023/0260055 A1* | 8/2023 | Perumalla ........ G05B 19/41885 |
| | | 700/276 |

* cited by examiner

<u>FIG. 4</u>

SYSTEMS AND METHODS FOR CONFIGURING PLANT ASSEMBLY STATIONS

INTRODUCTION

The technical field generally relates to vehicles, and more particularly relates to systems and methods for configuring plant assembly stations.

A vehicle manufacturing plant typically includes a plurality of plant assembly stations. The plant assembly stations are often reconfigured to accommodate changes in the production of different vehicle product types. Examples of vehicle product types include, but are not limited to, a sedan and a pick-up truck. A vehicle product type may be a specific vehicle model. In many instances, when a vehicle manufacturing plant changes the vehicle product type that will be produced, the vehicle manufacturing plant may be shut down for extended periods of time while the plant assembly stations are reconfigured to support the production of the vehicle product type.

Accordingly, it is desirable to provide improved methods and systems for configuring plant assembly stations. Other desirable features and characteristics will become apparent from the subsequent detailed description and the appended claims, taken in conjunction with the accompanying drawings and the foregoing technical field and background.

SUMMARY

In various embodiments, a plant assembly station configuration system includes at least one processor and at least one memory communicatively coupled to the at least one processor. The at least one memory includes instructions that upon execution by the at least one processor, cause the at least one processor to: receive plant sensor data generated by a plant sensor system, the plant sensor data being associated with a configuration of a first plant assembly station at a vehicle manufacturing plant; generate a digital twin of the first plant assembly station based in part on the plant sensor data; determine whether the configuration of the first plant assembly station is in accordance with operational regulations based on a simulation-based assessment of the digital twin of the first plant assembly station; and generate an operability status of the configuration of the first plant assembly station based on the determination.

In at least one embodiment, the at least one memory includes further instructions that upon execution by the at least one processor, cause the at least one processor to: receive a vehicle product type from a plant operation system; and generate the digital twin of the first plant assembly station based in part on the vehicle product type.

In at least one embodiment, the at least one memory includes further instructions that upon execution by the at least one processor, cause the at least one processor to: receive the plant sensor data generated by the plant sensor system, the plant sensor data being associated with a location of at least one plant structure; and generate the digital twin of the first plant assembly station based in part on the location of the at least one plant structure.

In at least one embodiment, the at least one memory includes further instructions that upon execution by the at least one processor, cause the at least one processor to: receive the plant sensor data generated by the plant sensor system, the plant sensor data being associated with a location of at least one fixed asset of the first plant assembly station at the vehicle manufacturing plant; and generate the digital twin of the first plant assembly station based in part on the location of the at least one fixed asset of the first plant assembly station.

In at least one embodiment, the at least one memory includes further instructions that upon execution by the at least one processor, cause the at least one processor to transmit the digital twin of the first plant assembly station to a plant operation system to enable the plant operation system to transmit instructions to a plurality of self-moving assets of the first plant assembly station to move to locations within the vehicle manufacturing plant in accordance with the digital twin of the first plant assembly station.

In at least one embodiment, each of the plurality of self-moving assets is one of an autonomous mobile robot (AMR) with plant equipment, an AMR with parts, an AMR hoist, an AMR with kitted parts, and an AMR with station lighting.

In at least one embodiment, the at least one memory includes further instructions that upon execution by the at least one processor, cause the at least one processor to: receive the plant sensor data generated by the plant sensor system, the plant sensor data being associated with a modification of at least one asset of the first plant assembly station; and generate the digital twin of the first plant assembly station based on the modification of the at least one asset at the first plant assembly station.

In at least one embodiment, the modification of the at least one asset includes one of an asset orientation change, an asset location change, swapping a position of a first asset with a position of a second asset, an asset replacement, an asset addition, and an asset removal.

In at least one embodiment, the modification of the at least one asset is implemented via instructions provided by a human worker to at least one self-moving asset of the first plant assembly station to move to a location within the vehicle manufacturing plant.

In at least one embodiment, the at least one memory includes further instructions that upon execution by the at least one processor, cause the at least one processor to: receive the plant sensor data generated by the plant sensor system, the plant sensor data being associated with configurations of a plurality of plant assembly stations at the vehicle manufacturing plant, the plurality of plant assembly stations including the first plant assembly station; generate a digital twin of the vehicle manufacturing plant including a plurality of digital twins of the plurality of plant assembly stations based on the plant sensor data; determine whether the configuration of the vehicle manufacturing plant is in accordance with the operational regulations based on a simulation-based assessment of the digital twin of the vehicle manufacturing plant; and transmit the digital twin of the vehicle manufacturing plant to a plant operation system to enable the plant operation system to transmit configuration commands to a plurality of self-moving assets of the plurality of plant assembly stations to move to locations within the vehicle manufacturing plant in accordance with the digital twin of the vehicle manufacturing plant.

In at least one embodiment, the at least one memory includes further instructions that upon execution by the at least one processor, cause the at least one processor to transmit the digital twin of the first plant assembly station to a plant operation system to enable the plant operation system to transmit component settings to at least one component of the plant assembly station in accordance with the digital twin of the first plant assembly station.

In at least one embodiment, one of the at least one of the plurality of components of the plant assembly station includes station lighting, station equipment, and a station tool.

In at least one embodiment, the configuration of the first plant assembly station at the vehicle manufacturing plant is associated with a relocation of the first plant assembly station from a first location within the vehicle manufacturing plant to a second location within the vehicle manufacturing plant.

In at least one embodiment, the configuration of the first plant assembly station at the vehicle manufacturing plant is one of a configuration of a new plant assembly station and a reconfiguration of an existing plant assembly station.

In various embodiments, a method for configuring a plant assembly station includes: receiving plant sensor data generated by a plant sensor system, the plant sensor data being associated with a configuration of a first plant assembly station at a vehicle manufacturing plant; generating a digital twin of the first plant assembly station based in part on the plant sensor data; determining whether the configuration of the first plant assembly station is in accordance with operational regulations based on a simulation-based assessment of the digital twin of the first plant assembly station; and generating an operability status of the configuration of the first plant assembly station based on the determination.

In at least one embodiment, the method further includes transmitting the digital twin of the first plant assembly station to a plant operation system to enable the plant operation system to transmit instructions to a plurality of self-moving assets of the first plant assembly station to move to locations within the vehicle manufacturing plant in accordance with the digital twin of the first plant assembly station.

In at least one embodiment, the method further includes: receiving the plant sensor data generated by the plant sensor system, the plant sensor data being associated with a modification of at least one asset of the first plant assembly station; and generating the digital twin of the first plant assembly station based on the modification of the at least one asset at the first plant assembly station, wherein the modification of the at least one asset includes one of an asset orientation change, an asset location change, swapping a position of a first asset with a position of a second asset, an asset replacement, an asset addition, and an asset removal.

In at least one embodiment, the method further includes: receiving the plant sensor data generated by the plant sensor system, the plant sensor data being associated with a modification of at least one asset of the first plant assembly station; and generating the digital twin of the first plant assembly station based on the modification of the at least one asset at the first plant assembly station, wherein the modification of the at least one asset is implemented via instructions provided by a human worker to at least one self-moving asset of the first plant assembly station to move to a location within the vehicle manufacturing plant.

In at least one embodiment, the method further includes transmitting the digital twin of the first plant assembly station to a plant operation system to enable the plant operation system to transmit component settings to at least one component of the plant assembly station in accordance with the digital twin of the first plant assembly station, wherein one of the at least one of the plurality of components of the plant assembly station is station lighting, a station equipment, and a station tool.

In various embodiments, a vehicle manufacturing plant includes a plurality of plant assembly stations, a plant sensor system, and a plant assembly station configuration system.

The plant assembly station configuration system includes at least one processor and at least one memory communicatively coupled to the at least one processor. The at least one memory includes instructions that upon execution by the at least one processor, cause the at least one processor to: receive plant sensor data generated by a plant sensor system, the plant sensor data being associated with a configuration of a first plant assembly station of the plurality of plant assembly stations at a vehicle manufacturing plant; generate a digital twin of the first plant assembly station based in part on the plant sensor data; determine whether the configuration of the first plant assembly station is in accordance with operational regulations based on a simulation-based assessment of the digital twin of the first plant assembly station; and generate an operability status of the configuration of the first plant assembly station based on the determination.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
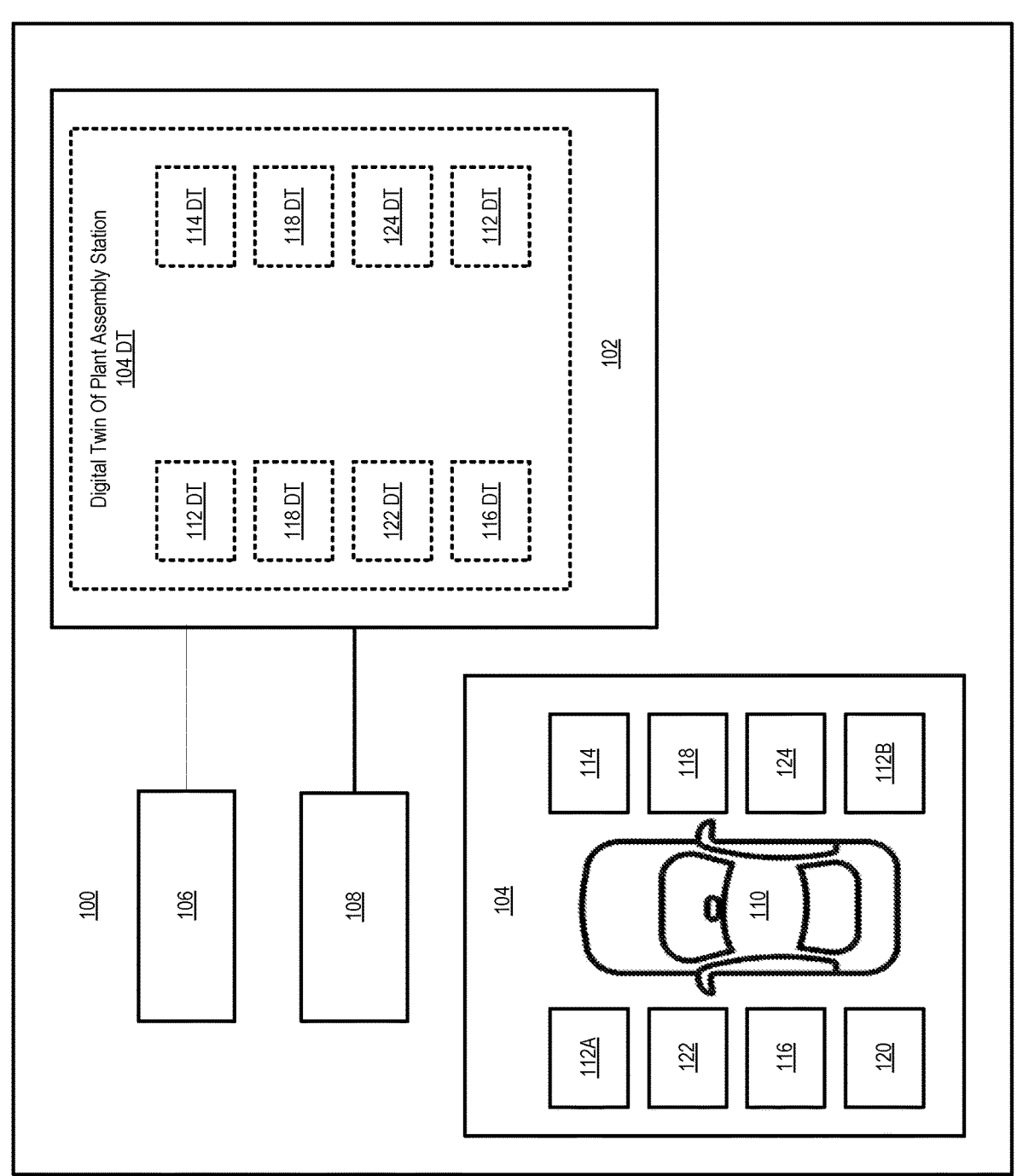
FIG. 1 is a functional block diagram of a vehicle manufacturing plant including a plant assembly station configuration system in accordance with at least one embodiment.

Referring to FIG. 1, a functional block diagram of a vehicle manufacturing plant 100 including a plant assembly station configuration system 102 in accordance with at least one embodiment is shown. The vehicle manufacturing plant 100 includes a plant assembly station 104, a plant operation system 106, a plant sensor system 108, and the plant assembly station configuration system 102. While the vehicle manufacturing plant 100 is shown as including a single plant assembly station 104, a vehicle manufacturing plant 100 typically includes a plurality of plant assembly stations 104. When a vehicle 110 is undergoing assembly at the vehicle manufacturing plant 100, different plant assembly stations 104 are configured to install different components in the vehicle 110. The plant assembly stations 104 are configured for the production of a specific vehicle product type. Examples of vehicle product types include, but are not limited to, a sedan and a pick-up truck. In various embodiments, the vehicle product type specifies a vehicle model.

A plurality of vehicles 110 may be undergoing assembly at the vehicle manufacturing plant 100 at the same time. Different vehicles 110 may be undergoing the installation of different vehicle components at different plant assembly stations 104 at the same time. Each of the vehicles 110 may be at a different point in the vehicle assembly process. The plant operation system 106 is configured to coordinate the manufacturing of the vehicles 110 at the vehicle manufacturing plant 100. The plant operation system 106 is configured to coordinate the configuration/reconfiguration of the different plant assembly station 104 at the vehicle manufacturing plant 100 to assemble vehicles 110 having a specific vehicle product type.

While a single centralized plant operation system 106 is shown, the vehicle manufacturing plant 100 may include a number of distributed plant operation systems that coordinate the assembly of vehicles 110 at the vehicle manufacturing plant 100. For example, the plant operation system 106 may include a plant control tower that communicates with a plurality of plant floor systems to coordinate the configuration/reconfiguration of the plant assembly stations 104 at the vehicle manufacturing plant 100. The plant operation system 106 is communicatively coupled to the plant assembly station configuration system 102.

The plant sensor system 108 includes a plurality of plant sensors distributed throughout the vehicle manufacturing plant 100. An example of a plant sensor is a camera. The plant sensor system 108 is configured to generate plant sensor data associated with the configuration of the plant assembly station(s) 104 in the vehicle manufacturing plant 100. The plant sensor system 108 is communicatively coupled to the plant assembly station configuration system 102.

The plant assembly station 104 includes a plurality of self-moving assets and one or more fixed assets. Examples of self-moving assets include, but are not limited to, an autonomous mobile robot (AMR) with equipment 112A, 112B, an AMR with hoist 114, an AMR with kitted parts 116, an AMR with lighting 118, and an AMR with parts 120. An example of a fixed asset is fixed equipment 122. The vehicle manufacturing plant 100 may include one or more plant structures 124. The positioning of the self-moving assets in the configuration of the plant assembly station 104 is based on the locations of the fixed equipment 122 and/or plant structure(s) 124. Different plant assembly stations 104 at the vehicle manufacturing plant 100 may have different configurations.

The plant assembly station configuration system 102 is configured to receive the plant sensor data generated by the plant sensor system 108. The plant sensor data is associated with the configuration of the plant assembly station 104. The plant assembly station configuration system 102 is configured to generate a digital twin of the plant assembly station 104 DT based on the plant sensor data. The digital twin of the plant assembly station 104 DT is a virtual representation of the physical configuration of the plant assembly station 104. The plant sensor system 108 provides a perception infrastructure that operates as a link to mirror the physical configuration of the physical plant assembly station 104 into a digital twin of the plant assembly station 104 DT at the plant assembly station configuration system 102. The location of the self-moving assets 112A, 112B, 114, 116, 118, 120, the fixed asset(s) 122, and/or the plant structure(s) 124 in the physical plant assembly station 104 are mirrored in the location of the digital twin representation of the self-moving assets 112A DT, 112B DT, 114 DT, 116 DT, 118 DT, 120 DT, the fixed asset 122 DT, and/or the plant structure 124 DT in the digital twin of the plant assembly station 104 DT.

In at least one embodiment, the plant assembly station configuration system 102 is configured to generate a configuration of a digital twin of a new plant assembly station 104 DT. The plant assembly station configuration system 102 is configured to facilitate the configuring of a new plant assembly station 104 in accordance with the configuration of the digital twin of the new plant assembly station 104 DT based on plant sensor data received from the plant sensor system 108. In at least one embodiment, the plant assembly station configuration system 102 is configured to generate a configuration of a digital twin of a relocated plant assembly station 104 DT. The plant assembly station configuration system 102 is configured to facilitate the configuring of the relocated plant assembly station 104 in accordance with the configuration of the digital twin of the relocated plant assembly station 104 DT based on plant sensor data received from the plant sensor system 108.

In at least one embodiment, the plant assembly station configuration system 102 is configured to generate a configuration of a digital twin of a modified plant assembly station 104 DT. The plant assembly station configuration system 102 is configured to facilitate the configuring of the modified plant assembly station 104 in accordance with the configuration of the digital twin of the modified plant assembly station 104 DT based on plant sensor data received from the plant sensor system 108. Examples of modifications to the configuration of the plant assembly station 104 include, but are not limited to, an asset orientation change, an asset location change, swapping a position of a first asset with a position of a second asset, an asset replacement, an asset addition, and an asset removal.

In various embodiments, the modifications to the configuration of the plant assembly station 104 are implemented via instructions provided by human workers to one or more of the self-moving assets 112A, 112B, 114, 116, 118, 120 of the plant assembly station 104. In various embodiments, the modifications to the configuration of the plant assembly station 104 are implemented in accordance with the configuration of the modified digital twin plant assembly station 104 DT via instructions provided by the plant operation system 106 to one or more of the self-moving assets 112A, 112B, 114, 116, 118, 120 of the plant assembly station 104.

The plant assembly station configuration system 102 is configured to determine whether a configuration of the plant assembly station 104 is in accordance with operational regulations based on a simulation-based assessment of the digital twin of the plant assembly station 104 DT. The plant assembly station configuration system 102 is configured to generate an operability status of the plant assembly station 104 based on the simulation-based assessment of the digital twin of the plant assembly station 104 DT. The configuration of the plant assembly station 104 is considered to have an operability status of operable if the plant assembly station configuration system 102 determines that the configuration of the plant assembly station 104 is in compliance with the operational regulations.

The configuration of the plant assembly station 104 is considered to have an operability status of not operable if the plant assembly station configuration system 102 determines that the configuration of the plant assembly station 104 is not in compliance with the operational regulations. The plant assembly station configuration system 102 is configured to assess additional modifications to the plant assembly station 104 until the plant assembly station configuration system 102 determines that the configuration of the plant assembly station 104 is in compliance with the operational regulations.

In at least one embodiment, the plant assembly station configuration system 102 is configured to receive plant sensor data generated by the plant sensor system 108. The plant sensor data is associated with configurations of a plurality of plant assembly stations 104 at the vehicle manufacturing plant 100. The plant assembly station configuration system 102 is configured to generate a digital twin of the vehicle manufacturing plant including a plurality of digital twins of the plurality of plant assembly stations 104 DT based on the plant sensor data. The plant assembly station configuration system 102 is configured to determine whether the configuration of the vehicle manufacturing plant 100 is in accordance with operational regulations based on a simulation-based assessment of the digital twin of the vehicle manufacturing plant. The plant assembly station configuration system 102 is configured to transmit the digital twin of the vehicle manufacturing plant to the plant operation system 106 to enable the plant operation system 106 to transmit instructions to a plurality of self-moving assets of each of the plurality of plant assembly stations 104 to move to locations within the vehicle manufacturing plant 100 in accordance with the digital twin of the vehicle manufacturing plant.

In at least one embodiment, the digital twin of the plant assembly station 104 DT generated by the plant assembly station configuration system 102 includes component settings for one or more components of the plant assembly station 104. The plant assembly station configuration system 102 is configured to transmit the digital twin of the plant assembly station 104 DT to the plant operation system 106 to enable the plant operation system 106 to transmit the component settings to the one or more components of the plant assembly station 104 in accordance with the digital twin of the first plant assembly station 104 DT. Examples of the components include, but are not limited to station lighting, station equipment, and a station tool.

Figure 2:
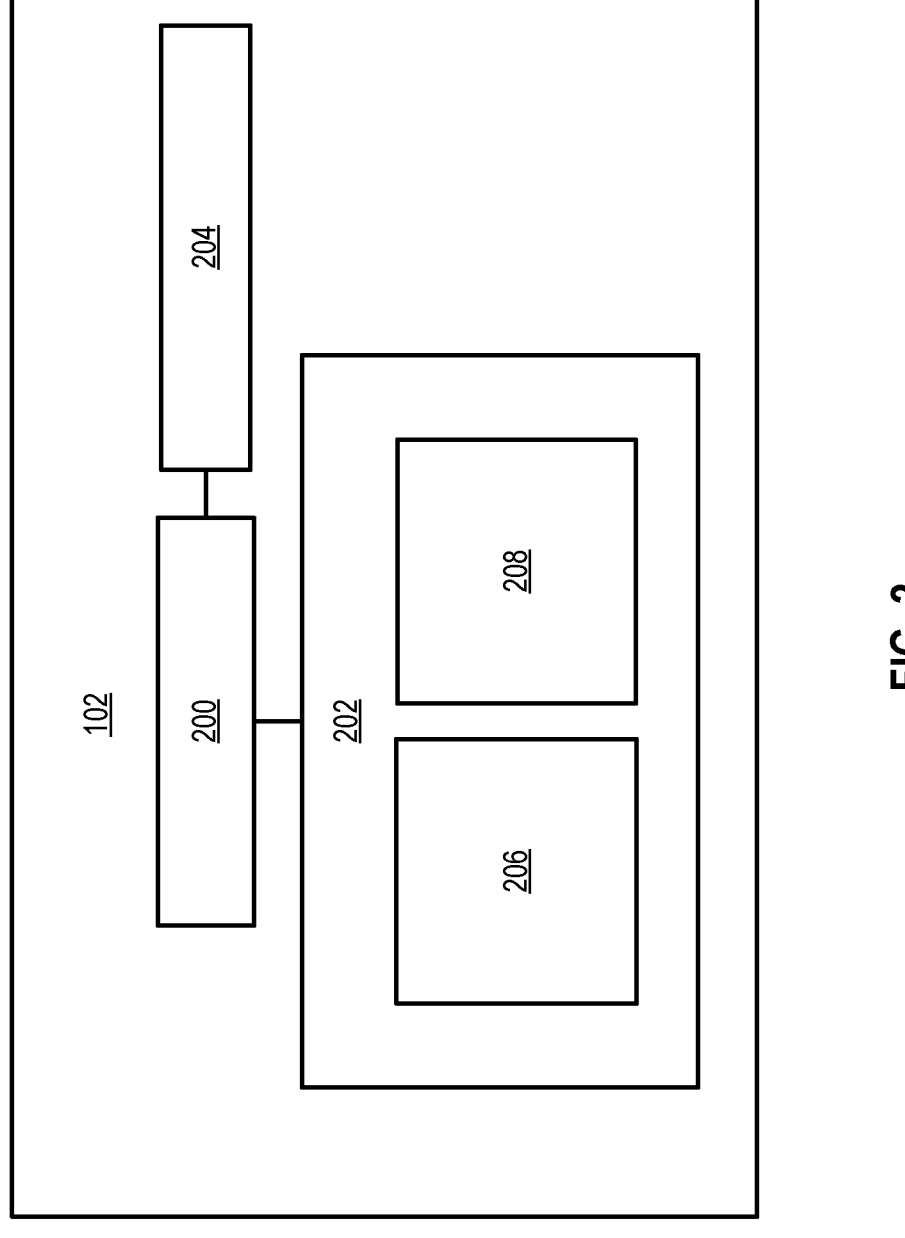
FIG. 2 is a functional block diagram of a plant assembly station configuration system in accordance with at least one embodiment.

Referring to FIG. 2, a functional block diagram of a plant assembly station configuration system 102 in accordance with at least one embodiment is shown. The plant assembly station configuration system 102 includes at least one processor 200, at least one memory 202, and a communication system 204. The processor(s) 200 is communicatively coupled to the at least one memory 202 and to the communication system 204. The processor(s) 200 is a programmable device that includes one or more instructions stored in or associated with the at least one memory 202. The at least one memory 202 includes instructions that the processor(s) 200 is configured to execute.

The at least one memory 202 is a computer readable storage device or media. The processor(s) 200 can be any custom made or commercially available processor, a central processing unit (CPU), a graphics processing unit (GPU), an auxiliary processor among several processors, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor(s) 200 is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the plant assembly station configuration system 102. The instructions may include one or more separate programs, each of which comprises an ordered listing of executable instructions for implementing logical functions. The instructions, when executed by the processor(s) 200 perform logic, calculations, methods and/ or algorithms for implementing the configuration of plant assembly stations 104.

The communication system 204 is configured to facilitate communications between the plant assembly station configuration system 102 and the plant operation systems 106. The at least one memory 202 includes a plant assembly station digital twin generator 206 and a plant assembly station configuration assessor 208. The plant assembly station configuration system 102 may include additional elements that facilitate operation of the plant assembly station configuration system 102.

Figure 3:
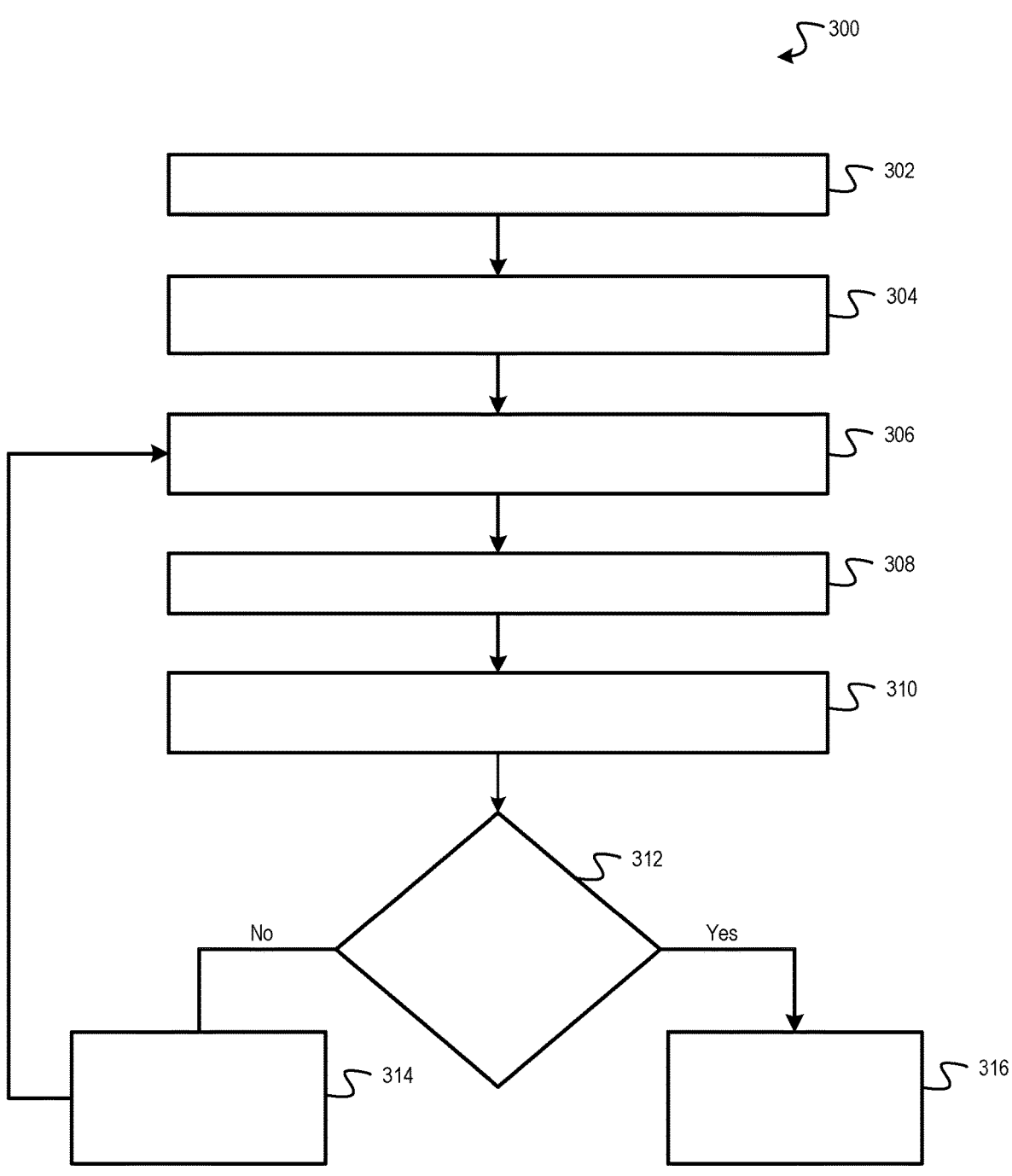
FIG. 3 is a flowchart representation of a method of configuring a plant assembly station via human worker provided instructions to self-moving assets in accordance with at least one embodiment.

Referring to FIG. 3, a flowchart representation of a method 300 of configuring a plant assembly station 104 via human worker provided instructions to self-moving assets 112A, 112B, 114, 116, 118, 120 in accordance with at least one embodiment is shown. The method 300 will be described with reference to an exemplary implementation of the plant assembly station configuration system 102. As can be appreciated in light of the disclosure, the order of operation within the method 300 is not limited to the sequential execution as illustrated in FIG. 3 but may be performed in one or more varying orders as applicable and in accordance with the present disclosure.

At 302, the plant operation system 106 identifies a vehicle product type for production at the vehicle manufacturing plant 100. Examples of vehicle product types include, but are not limited to, a sedan and a pick-up truck. In various embodiments, the vehicle product type specifies a vehicle model. At 304, the plant operation system 106 confirms availability of resources needed for the production of the vehicle product type. Examples of resources include, but are not limited to, station equipment, tooling, materials, kitted parts, and manpower.

At 306, a configuration of a plant assembly station 104 is modified via human worker instructions provided to one or more self-moving assets 112A, 112B, 114, 116, 118, 120 of the plant assembly station 104. Examples of self-moving assets 112A, 112B, 114, 116, 118, 120 include, but are not limited to, an AMR with equipment 112A, 112B, an AMR with hoist 114, an AMR with kitted parts 116, an AMR with lighting 118, and an AMR with parts 120.

At 308, the plant assembly station configuration system 102 receives plant sensor data generated by a plant sensor system 108. In at least one embodiment, the plant assembly station digital twin generator 206 receives the plant sensor data generated by a plant sensor system 108. The plant sensor system 108 includes a plurality of plant sensors distributed throughout the vehicle manufacturing plant 100. The plant sensor system 108 is configured to generate plant sensor data associated with the configuration of the plant assembly station(s) 104 to the plant assembly station configuration system 102.

At 310, the plant assembly station configuration system 102 generates a digital twin of the plant assembly station 104 DT based on the plant sensor data. In at least one embodiment, the plant assembly station digital twin generator 206 generates the digital twin of the plant assembly station 104 DT based on the plant sensor data. The digital twin of the plant assembly station 104 DT is a virtual representation of the physical configuration of the plant assembly station 104. The plant sensor system 108 provides a perception infrastructure that operates as a link to mirror the physical configuration of the physical plant assembly station 104 into a digital twin of the plant assembly station 104 DT at the plant assembly station configuration system 102.

At 312, the plant assembly station configuration system 102 determines whether the modified configuration of the plant assembly station 104 is in compliance with operational regulations based on an assessment of the digital twin of the plant assembly station 104 DT. In at least one embodiment, the plant assembly station configuration assessor 208 determines whether the modified configuration of the plant assembly station 104 is in compliance with operational regulations based on an assessment of the digital twin of the plant assembly station 104 DT. Examples of operational regulations include, but are not limited to, safety regulations and operational clearances.

If the plant assembly station configuration system 102 determines that the modified configuration of the plant assembly station 104 is not in compliance with operational regulations, the plant assembly station configuration system 102 generates an operability status indicating that the plant assembly station 104 is not operable at 314. In at least one embodiment, if the plant assembly station configuration assessor 208 determines that the modified configuration of the plant assembly station 104 is not in compliance with operational regulations, the plant assembly station configuration assessor 208 generates an operability status indicating that the plant assembly station 104 is not operable at 314. The method 300 returns to 306.

If the plant assembly station configuration system 102 determines that the modified configuration of the plant assembly station 104 is in compliance with operational regulations, the plant assembly station configuration system 102 generates an operability status indicating that the plant assembly station 104 is operable at 316. In at least one embodiment, if the plant assembly station configuration assessor 208 determines that the modified configuration of the plant assembly station 104 is in compliance with operational regulations, the plant assembly station configuration assessor 208 generates an operability status indicating that the plant assembly station 104 is operable at 316. The verification of the plant assembly station 104 based on the assessment of the digital twin of the plant assembly station 104 DT by the plant assembly station configuration system is complete and the manufacturing operation for the vehicle product type is commissioned.

Figure 4:
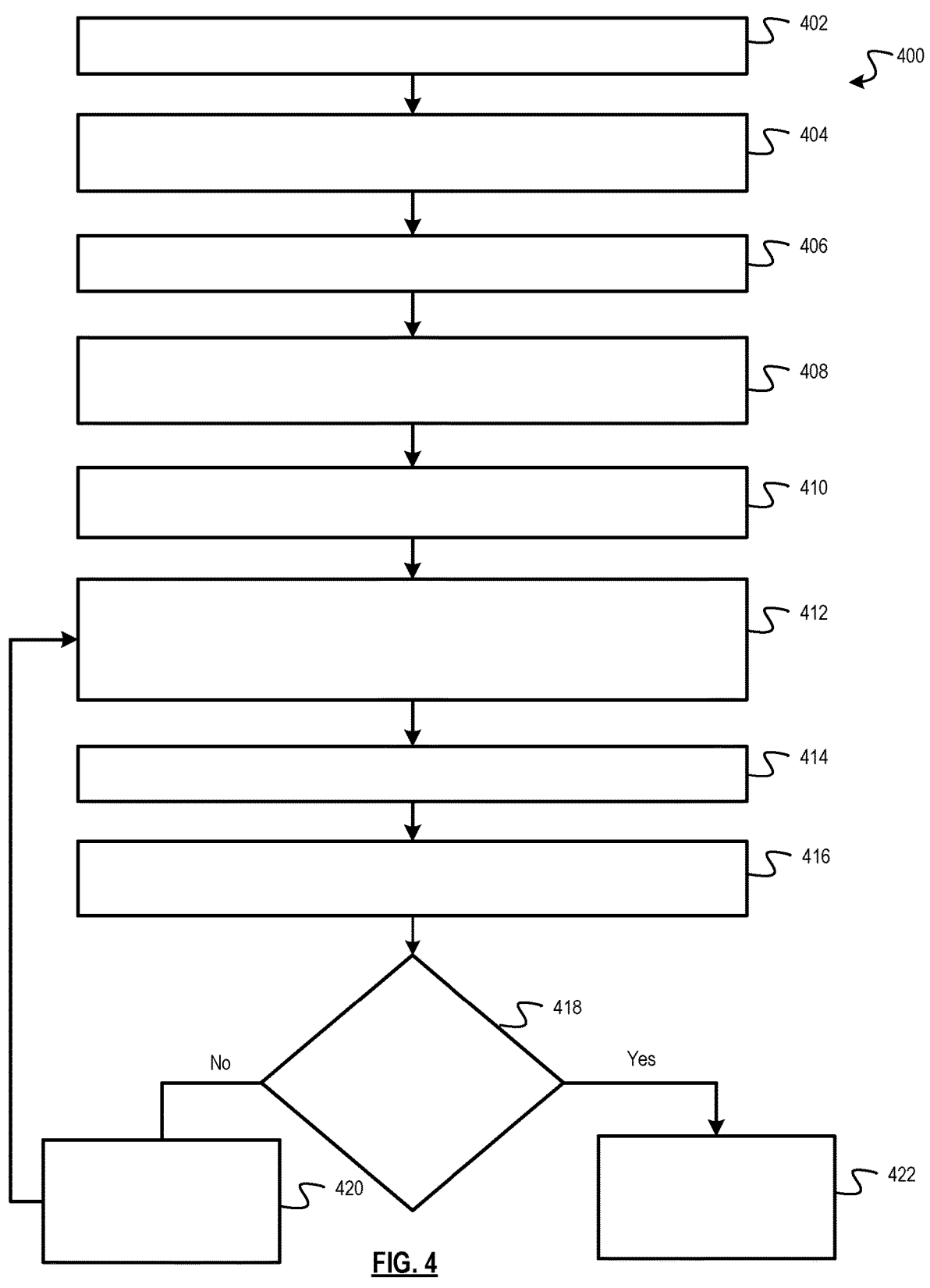
FIG. 4 is a flowchart representation of a method of automatically configuring a plant assembly station via plant operation system provided instructions to self-moving assets in accordance with at least one embodiment.

Referring to FIG. 4, a flowchart representation of a method 400 of automatically configuring a plant assembly station 104 via plant operation system 106 provided instructions to self-moving assets 112A, 112B, 114, 116, 118, 120 in accordance with at least one embodiment is shown. The method 400 will be described with reference to an exemplary implementation of the plant assembly station configuration system 102. As can be appreciated in light of the disclosure, the order of operation within the method 400 is not limited to the sequential execution as illustrated in FIG. 4 but may be performed in one or more varying orders as applicable and in accordance with the present disclosure.

At 402, the plant operation system 106 identifies a vehicle product type for production at the vehicle manufacturing plant 100. Examples of vehicle product types include, but are not limited to, a sedan and a pick-up truck. In various embodiments, the vehicle product type specifies a vehicle model. At 404, the plant operation system 106 confirms availability of resources needed for the production of the vehicle product type. Examples of resources include, but are not limited to, station equipment, tooling, materials, kitted parts, and manpower.

At 406, the plant assembly station configuration system 102 receives plant sensor data generated by a plant sensor system 108. In at least one embodiment, the plant assembly station digital twin generator 206 receives the plant sensor data generated by a plant sensor system 108. The plant sensor system 108 includes a plurality of plant sensors distributed throughout the vehicle manufacturing plant 100. The plant sensor system 108 is configured to generate plant sensor data associated with the configuration of the plant assembly station 104 to the plant assembly station configuration system 102. In at least one embodiment, the plant sensor data is associated with the location of one or more plant structures 124 at the vehicle manufacturing plant 100. In at least one embodiment, the plant sensor data is associated with one or more fixed assets of the plant assembly station 104. An example of a fixed asset is fixed equipment 122. In at least one embodiment, the plant sensor data is associated with the location of one or self-moving assets 112A, 112B, 114, 116, 118, 120 of the plant assembly station 104. Examples of self-moving assets 112A, 112B, 114, 116, 118, 120 include, but are not limited to, an AMR with equipment 112A, 112B, an AMR with hoist 114, an AMR with kitted parts 116, an AMR with lighting 118, and an AMR with parts 120.

At 408, the plant assembly station configuration system 102 generates a digital twin of the plant assembly station 104 DT based on the plant sensor data and the vehicle product type that is in compliance with operational regulations. In at least one embodiment, the plant assembly station digital twin generator 206 generates a digital twin of the plant assembly station 104 DT based on the plant sensor data and the vehicle product type that is in compliance with operational regulations. Examples of operational regulations, but are not limited to, safety regulations and operational clearances. At 410, the plant assembly station configuration system 102 transmits the configuration of the digital twin plant assembly station 104 DT to the plant operation system 106.

At 412, the plant operation system 106 implements a configuration of the plant assembly station 104 in accordance with the configuration of the digital twin plant assembly station 104 DT via instructions provided by the plant operation system 106 to the self-moving assets 112A, 112B, 114, 116, 118, 120 of the plant assembly station 104. Upon the receipt of the instructions, each self-moving asset 112A, 112B, 114, 116, 118, 120 moves to the appropriate location in the vehicle manufacturing plant 100 to 112A, 112B, 114, 116, 118, 120 to automatically configure the plant assembly station 104.

At 414, the plant assembly station configuration system 102 receives plant sensor data feedback generated by the plant sensor system 108. In at least one embodiment, the plant assembly station digital twin generator 206 receives the plant sensor data feedback generated by a plant sensor system 108. The plant sensor data provides feedback regarding the configuration of the plant assembly system 104 that is generated in response to the instructions provided by the plant operation system 106 to the self-moving assets 112A, 112B, 114, 116, 118, 120 of the plant assembly station 104.

At 416, the plant assembly station configuration system 102 generates a digital twin of the plant assembly station 104 DT based on the plant sensor data feedback. In at least one embodiment, the plant assembly station digital twin generator 206 generates the digital twin of the plant assembly station 104 DT based on the plant sensor data feedback. At 418, the plant assembly station configuration system 102 determines whether the configuration of the plant assembly station 104 is in compliance with operational regulations based on an assessment of the digital twin of the plant assembly station 104 DT. In at least one embodiment, the plant assembly station configuration assessor 208 determines whether the configuration of the plant assembly station 104 is in compliance with the operational regulations based on an assessment of the digital twin of the plant assembly station 104 DT.

If the plant assembly station configuration system 102 determines that the configuration of the plant assembly station 104 is not in compliance with operational regulations, the plant assembly station configuration system 102 generates an operability status indicating that the plant assembly station 104 is not operable at 420. In at least one embodiment, if the plant assembly station configuration assessor 208 determines that the configuration of the plant assembly station 104 is not in compliance with operational regulations, the plant assembly station configuration assessor 208 generates an operability status indicating that the plant assembly station 104 is not operable at 420. The method 400 returns to 412, If the plant assembly station configuration system 102 determines that the configuration of the plant assembly station 104 is in compliance with operational regulations, the plant assembly station configuration system 102 generates an operability status indicating that the plant assembly station 104 is operable at 422. In at least one embodiment, if the plant assembly station configuration assessor 208 determines that the configuration of the plant assembly station 104 is in compliance with operational regulations, the plant assembly station configuration assessor 208 generates an operability status indicating that the plant assembly station 104 is operable at 316. The verification of the plant assembly station 104 based on the assessment of the digital twin of the plant assembly station 104 DT is complete and the manufacturing operation for the vehicle product type is commissioned.

Figure 5:
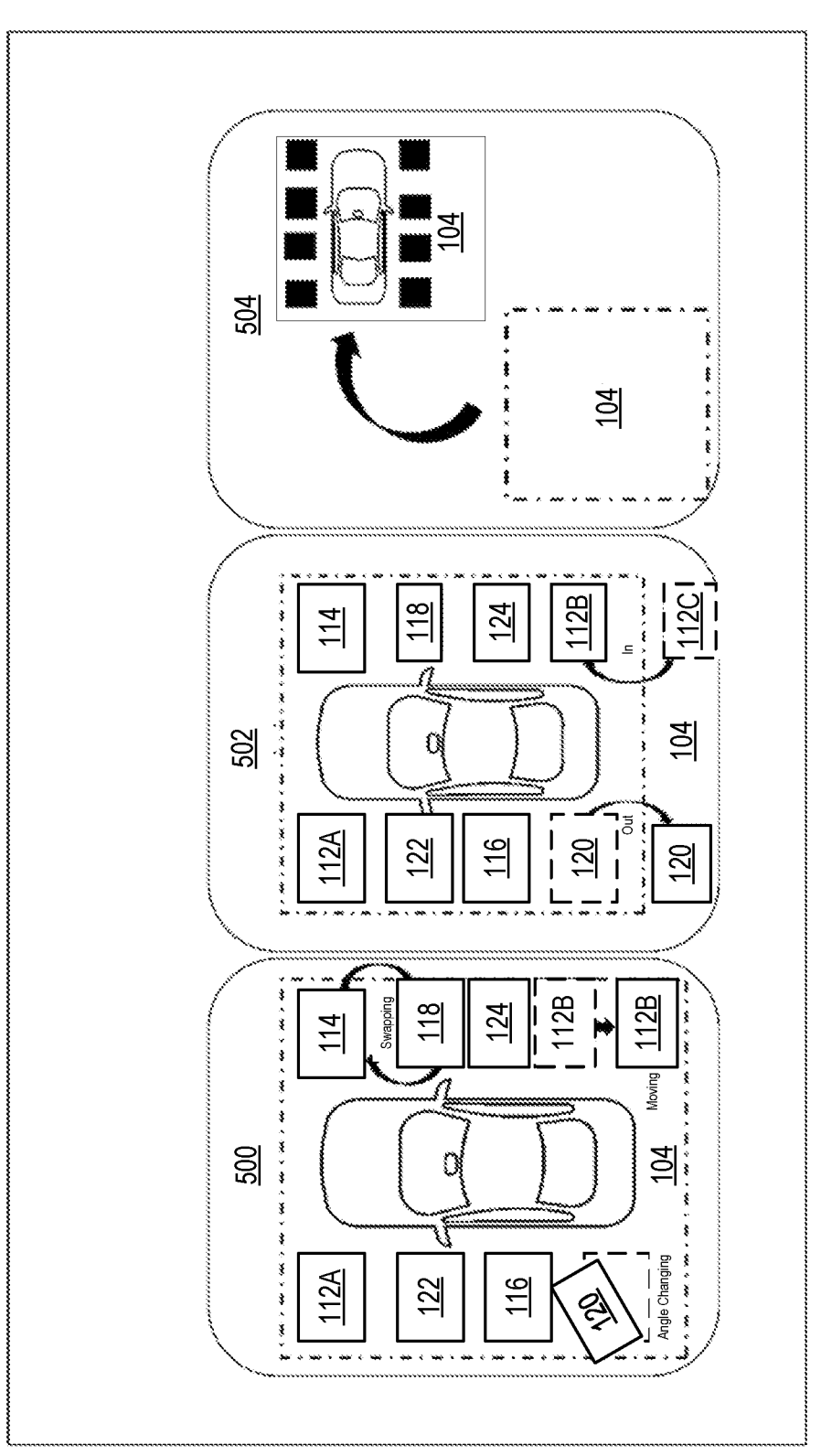
FIG. 5 is a diagrammatic representation of examples of different levels of reconfigurations of a plant assembly plant that can be facilitated by a plant assembly station configuration system in accordance with at least one embodiment.

Referring to FIG. 5, a diagrammatic representation of examples 500, 502, 504 of different levels of reconfigurations of a plant assembly plant 104 that can be facilitated by a plant assembly station configuration system 102 in accordance with at least one embodiment is shown. The plant assembly station 104 in each example 500, 502, 504 is similar to the plant assembly station 104 in FIG. 1. In each example 500, 502, 504, the plant assembly station 104 includes autonomous mobile robots (AMR) with equipment 112A, 112B, 112C, an AMR with hoist 114, an AMR with kitted parts 116, an AMR with lighting 118, an AMR with parts 120, fixed equipment 122, and a plant structure 124.

The first example 500 is illustrative of a low-level reconfiguration of a plant assembly station 104. The angle of the AMR with parts 120 has been modified. The location of the AMR hoist 114 has been swapped with the location of the AMR with lighting 118. The AMR with equipment 112B has been moved. In at least one embodiment, the low-level reconfiguration of the plant assembly station 104 is implemented via human worker provided instructions to the self-moving assets 112A, 112B, 114, 116, 118, 120. In at least one embodiment, the low-level reconfiguration of the plant assembly station 104 is implemented via automatic reconfiguration of the plant assembly station 104 via plant operation system 106 provided instructions to the self-moving assets 112A, 112B, 114, 116, 118, 120.

The plant assembly station configuration system 102 receives plant sensor data from the plant sensor system 108. The plant sensor data provides information regarding the low-level reconfiguration of the plant assembly station 104. The plant assembly station configuration system 102 generates a digital twin of the reconfigured plant assembly station 104 DT based on the plant sensor data. The plant assembly station configuration system 102 performs a simulation-based assessment of the digital twin of the plant assembly station 104 DT to determine if the reconfigured the plant assembly station 104 is in compliance with operational regulations.

If the plant assembly station configuration system 102 determines that the reconfigured plant assembly station 104 is in compliance with operational regulations based on the assessment of the digital twin of the reconfigured plant assembly station 104 DT, the plant assembly station configuration system 102 generates an operability status of the reconfigured plant assembly station 104 as operable. If the plant assembly station configuration system 102 determines that the reconfigured plant assembly station 104 is not in compliance with operational regulations based on the assessment of the digital twin of the reconfigured plant assembly station 104 DT, the plant assembly station configuration system 102 generates an operability status of the reconfigured plant assembly station 104 as not operable.

If the plant assembly station configuration system 102 has determined that the operability status of the reconfigured plant assembly station 104 is not operable, additional modifications are implemented by via instructions provided to the self-moving assets 112A, 112B, 114, 116, 118, 120 of the plant assembly station 104 to attempt to bring the configuration of the plant assembly station 104 in compliance with the operational regulations and the process described above is repeated. The instructions are one of human worker provided instructions and plant operation station 106 provided instructions.

The second example 502 is illustrative of a mid-level reconfiguration of a plant assembly station 104. The AMR with parts 120 has been removed from the plant assembly station 104. The AMR with equipment 112B has been removed and replaced with a different AMR with equipment 112C. In at least one embodiment, the mid-level reconfiguration of the plant assembly station 104 is implemented via human worker provided instructions to the self-moving assets 112A, 112B, 114, 116, 118, 120. In at least one embodiment, the mid-level reconfiguration of the plant assembly station 104 is implemented via automatic reconfiguration of the plant assembly station 104 via plant operation system 106 provided instructions to the self-moving assets 112A, 112B, 114, 116, 118, 120.

The plant assembly station configuration system 102 receives plant sensor data from the plant sensor system 108. The plant sensor data provides information regarding the mid-level reconfiguration of the plant assembly station 104. The plant assembly station configuration system 102 generates a digital twin of the reconfigured plant assembly station 104 DT based on the plant sensor data. The plant assembly station configuration system 102 performs a simulation-based assessment of the digital twin of the plant assembly station 104 DT to determine if the reconfigured the plant assembly station 104 is in compliance with operational regulations.

If the plant assembly station configuration system 102 determines that the reconfigured plant assembly station 104 is in compliance with operational regulations based on the assessment of the digital twin of the reconfigured plant assembly station 104 DT, the plant assembly station configuration system 102 generates an operability status of the reconfigured plant assembly station 104 as operable. If the plant assembly station configuration system 102 determines that the reconfigured plant assembly station 104 is not in compliance with operational regulations based on the assessment of the digital twin of the reconfigured plant assembly station 104 DT, the plant assembly station configuration system 102 generates an operability status of the reconfigured plant assembly station 104 as not operable.

If the plant assembly station configuration system 102 has determined that the operability status of the reconfigured plant assembly station 104 is not operable, additional modifications are implemented by via instructions provided to the self-moving assets 112A, 112B, 114, 116, 118, 120 of the plant assembly station 104 to attempt to bring the configuration of the plant assembly station 104 in compliance with the operational regulations and the process described above is repeated. The instructions are one of human worker provided instructions and plant operation station 106 provided instructions.

The third example 506 is illustrative of a high-level reconfiguration of a plant assembly station 104. The entire plant assembly station 104 has been relocated from a first location to a second location at the vehicle manufacturing plant 100. In at least one embodiment, the high-level reconfiguration of the plant assembly station 104 is implemented via human worker provided instructions to the self-moving assets 112A, 112B, 114, 116, 118, 120. In at least one embodiment, the high-level reconfiguration of the plant assembly station 104 is implemented via automatic reconfiguration of the plant assembly station 104 via plant operation system 106 provided instructions to the self-moving assets 112A, 112B, 114, 116, 118, 120.

The plant assembly station configuration system 102 receives plant sensor data from the plant sensor system 108. The plant sensor data provides information regarding the relocated plant assembly station 104. The plant assembly station configuration system 102 generates a digital twin of the relocated plant assembly station 104 DT based on the plant sensor data. The plant assembly station configuration system 102 performs a simulation-based assessment of the digital twin of the relocated plant assembly station 104 DT to determine if the relocated the plant assembly station 104 is in compliance with operational regulations.

If the plant assembly station configuration system 102 determines that the relocated plant assembly station 104 is in compliance with operational regulations based on the assessment of the digital twin of the relocated plant assembly station 104 DT, the plant assembly station configuration system 102 generates an operability status of the relocated plant assembly station 104 as operable. If the plant assembly station configuration system 102 determines that the relocated plant assembly station 104 is not in compliance with operational regulations based on the assessment of the digital twin of the relocated plant assembly station 104 DT, the plant assembly station configuration system 102 generates an operability status of the relocated plant assembly station 104 as not operable.

If the plant assembly station configuration system 102 has determined that the operability status of the relocated plant assembly station 104 is not operable, additional modifications are implemented by via instructions provided to the self-moving assets 112A, 112B, 114, 116, 118, 120 of the plant assembly station 104 to attempt to bring the configuration of the relocated plant assembly station 104 in compliance with the operational regulations and the process described above is repeated. The instructions are one of human worker provided instructions and plant operation station 106 provided instructions.

In various embodiments, the plant assembly station configuration system 102 is configured to generate a digital twin of a new plant assembly station 104 in accordance with operational regulations. The plant assembly station configuration system 102 is configured to transmit the digital twin of the new plant assembly station 104 to the plant operation system 106. The plant operation system 106 transmits instructions to self-moving assets 112A, 112B, 114, 116, 118, 120 to configure a new plant assembly station 104 in accordance with the configuration of the digital twin of the new plant assembly station 104. The use of a plant assembly station configuration system 102 in the configuration/reconfiguration of plant assembly stations 104 at a vehicle manufacturing plant 100 allows a physical manufacturing operation layout to be efficiently designed, verified, and replicated within an assembly location at a vehicle manufacturing plant 100. The implementation of modifications to plant assembly stations 104 using digital twin verification at a plant assembly station configuration system 102 will enable real-time plant assembly station 104 adjustments.

The plant assembly station configuration system 102 assesses modifications to plant assembly stations 104 via centralized direction that prioritizes and coordinates modifications within the plant assembly stations 104. Based on the vehicle type product, the digital twin (virtual copy) of a vehicle manufacturing plant 100 can be used to evaluate the overall plant floor system environment and adjust placement of equipment and tools, material, physical fixed structures, and other assets to change or make recommendations for more efficient configurations. The commissioning can be efficiently carried out by self-moving assets 112A, 112B,

114, 116, 118, 120 and confirmed by the perception infrastructure system as defined the plant sensor system 108 and the assessment of the digital twin of the vehicle manufacturing plant 100.

The plant assembly station configuration system 102 enables reconfiguring a manufacturing operation layout with self-moving assets and digital-twin verification. The perception infrastructure (cameras, sensors, and software) act as a link to mirror the physical plant assembly station 104 into a digital twin of the plant assembly station 104 DT. The digital twin of the plant assembly station 104 DT can be used to verify the manually or automatically modified layout of the plant assembly station 104 and initiate changes to the plant assembly stations 104 based on manufacturing operational regulations. The self-moving assets can be reconfigured by changing its location or orientation in the plant assembly station 104.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A plant assembly station configuration system comprising:
   at least one processor; and
   at least one memory communicatively coupled to the at least one processor, the at least one memory comprising instructions that upon execution by the at least one processor, cause the at least one processor to:
      receive plant sensor data generated by a plant sensor system, the plant sensor data being associated with configurations of a plurality of plant assembly stations at a vehicle manufacturing plant;
      generate a digital twin of the vehicle manufacturing plant including a plurality of digital twins of the plurality of plant assembly stations based on the plant sensor data;
      make a first determination whether a configuration of the vehicle manufacturing plant is in accordance with operational regulations based on a simulation-based assessment of the digital twin of the vehicle manufacturing plant;
      transmit the digital twin of the vehicle manufacturing plant to a plant operation system to enable the plant operation system to transmit instructions to a plurality of self-moving assets of the plurality of plant assembly stations to move to locations within the vehicle manufacturing plant in accordance with the digital twin of the vehicle manufacturing plant based on the first determination;
      receive plant sensor data associated with a configuration of a first plant assembly station of the plurality of plant assembly stations and a modification of at least one asset of the first plant assembly station, wherein the modification of the at least one asset is implemented via instructions provided by a human worker to at least one self-moving asset of the first plant assembly station to move to a location within the vehicle manufacturing plant;
      generate a digital twin of the first plant assembly station based in part on the plant sensor data associated with the configuration of the first plant assembly station and the modification of the at least one asset of the first plant assembly station;
      make a second determination whether the configuration of the first plant assembly station is in accordance with the operational regulations based on a simulation-based assessment of the digital twin of the first plant assembly station;
      generate an operability status of the configuration of the first plant assembly station based on the second determination and
      transmit the digital twin of the first plant assembly station to the plant operation system to enable the plant operation system to:
         transmit instructions to a plurality of self-moving assets of the first plant assembly station to move to locations within the vehicle manufacturing plant in accordance with the digital twin of the first plant assembly station, wherein the plurality of self-moving assets includes an autonomous mobile robot (AMR) with plant equipment, an AMR with parts, an AMR hoist, an AMR with kitted parts, and an AMR with station lighting, and
         transmit component settings to at least one component of the first plant assembly station in accordance with the digital twin of the first plant assembly station.

2. The system of claim 1, wherein the at least one memory comprises further instructions that upon execution by the at least one processor, cause the at least one processor to:
   receive a vehicle product type from the plant operation system; and
   generate the digital twin of the first plant assembly station based in part on the vehicle product type.

3. The system of claim 1, wherein the at least one memory comprises further instructions that upon execution by the at least one processor, cause the at least one processor to:
   receive the plant sensor data generated by the plant sensor system, the plant sensor data being associated with a location of at least one plant structure; and
   generate the digital twin of the first plant assembly station based in part on the location of the at least one plant structure.

4. The system of claim 1, wherein the at least one memory comprises further instructions that upon execution by the at least one processor, cause the at least one processor to:
   receive the plant sensor data generated by the plant sensor system, the plant sensor data being associated with a location of at least one fixed asset of the first plant assembly station at the vehicle manufacturing plant; and
   generate the digital twin of the first plant assembly station based in part on the location of the at least one fixed asset of the first plant assembly station.

5. The system of claim 1, wherein the modification of the at least one asset comprises one of an asset orientation change, an asset location change, swapping a position of a first asset with a position of a second asset, an asset replacement, an asset addition, and an asset removal.

6. The system of claim 1, wherein one of the at least one component of the plant assembly station comprises station lighting, station equipment, and a station tool.

7. The system of claim 1, wherein the configuration of the first plant assembly station at the vehicle manufacturing plant is associated with a relocation of the first plant assembly station from a first location within the vehicle manufacturing plant to a second location within the vehicle manufacturing plant.

8. The system of claim 1, wherein the configuration of the first plant assembly station at the vehicle manufacturing plant is one of a configuration of a new plant assembly station and a reconfiguration of an existing plant assembly station.

9. A method for configuring a plant assembly station comprising:

receiving plant sensor data generated by a plant sensor system, the plant sensor data being associated with configurations of a plurality of plant assembly stations at a vehicle manufacturing plant;

generating a digital twin of the vehicle manufacturing plant including a plurality of digital twins of the plurality of plant assembly stations based on the plant sensor data;

making a first determination regarding whether a configuration of the vehicle manufacturing plant is in accordance with operational regulations based on a simulation-based assessment of the digital twin of the vehicle manufacturing plant;

transmitting the digital twin of the vehicle manufacturing plant to a plant operation system to enable the plant operation system to transmit instructions to a plurality of self-moving assets of the plurality of plant assembly stations to move to locations within the vehicle manufacturing plant in accordance with the digital twin of the vehicle manufacturing plant based on the first determination;

receiving plant sensor data associated with a configuration of a first plant assembly station of the plurality of plant assembly stations and a modification of at least one asset of the first plant assembly station, wherein the modification of the at least one asset is implemented via instructions provided by a human worker to at least one self-moving asset of the first plant assembly station to move to a location within the vehicle manufacturing plan;

generating a digital twin of the first plant assembly station based in part on the plant sensor data associated with the configuration of the first plant assembly station and the modification of the at least one asset of the first plant assembly station;

making a second determination whether the configuration of the first plant assembly station is in accordance with the operational regulations based on a simulation-based assessment of the digital twin of the first plant assembly station;

generating an operability status of the configuration of the first plant assembly station based on the second determination; and transmitting the digital twin of the first plant assembly station to the plant operation system to enable the plant operation system to:

transmit instructions to a plurality of self-moving assets of the first plant assembly station to move to locations within the vehicle manufacturing plant in accordance with the digital twin of the first plant assembly station, wherein the plurality of self-moving assets includes an autonomous mobile robot (AMR) with plant equipment, an AMR with parts, an AMR hoist, an AMR with kitted parts, and an AMR with station lighting, and transmit component settings to at least one component of the first plant assembly station in accordance with the digital twin of the first plant assembly station.

10. The method of claim 9, wherein the modification of the at least one asset comprises one of an asset orientation change, an asset location change, swapping a position of a first asset with a position of a second asset, an asset replacement, an asset addition, and an asset removal.

11. The method of claim 9, further comprising:

receiving a vehicle product type from the plant operation system; and generating the digital twin of the first plant assembly station based in part on the vehicle product type.

12. The method of claim 9, further comprising:

receiving the plant sensor data generated by the plant sensor system, the plant sensor data being associated with a location of at least one plant structure; and generating the digital twin of the first plant assembly station based in part on the location of the at least one plant structure.

13. A vehicle manufacturing plant comprising a plurality of plant assembly stations;

a plant sensor system; and a plant assembly station configuration system, the plant assembly station configuration system comprising at least one processor and at least one memory communicatively coupled to the at least one processor, the at least one memory comprising instructions that upon execution by the at least one processor, cause the at least one processor to:

receive plant sensor data generated by the plant sensor system, the plant sensor data being associated with configurations of the plurality of plant assembly stations;

generate a digital twin of the vehicle manufacturing plant including a plurality of digital twins of the plurality of plant assembly stations based on the plant sensor data;

make a first determination regarding whether a configuration of the vehicle manufacturing plant is in accordance with operational regulations based on a simulation-based assessment of the digital twin of the vehicle manufacturing plant;

transmit the digital twin of the vehicle manufacturing plant to a plant operation system to enable the plant operation system to transmit instructions to a plurality of self-moving assets of the plurality of plant assembly stations to move to locations within the vehicle manufacturing plant in accordance with the digital twin of the vehicle manufacturing plant based on the first determination;

receive plant sensor data associated with a configuration of a first plant assembly station of the plurality of plant assembly stations and a modification of at least one asset of the first plant assembly station, wherein the modification of the at least one asset is implemented via instructions provided by a human worker to at least one self-moving asset of the first plant assembly station to move to a location within the vehicle manufacturing plant;

generate a digital twin of the first plant assembly station based in part on the plant sensor data associated with the configuration of the first plant assembly station and the modification of the at least one asset of the first plant assembly station;

make a second determination whether the configuration of the first plant assembly station is in accordance with the operational regulations based on a simulation-based assessment of the digital twin of the first plant assembly station;

generate an operability status of the configuration of the first plant assembly station based on the second determination; and transmit the digital twin of the first plant assembly station to the plant operation system to enable the plant operation system to:

transmit instructions to a plurality of self-moving assets of the first plant assembly station to move to locations within the vehicle manufacturing plant in accordance with the digital twin of the first plant assembly station, wherein the plurality of self-moving assets includes an autonomous mobile robot (AMR) with plant equipment, an AMR with parts, an AMR hoist, an AMR with kitted parts, and an AMR with station lighting, and transmit component settings to at least one component of the first plant assembly station in accordance with the digital twin of the first plant assembly station.

14. The vehicle manufacturing plant of claim 13, wherein the at least one memory comprises further instructions that upon execution by the at least one processor, cause the at least one processor to:

receive a vehicle product type from the plant operation system; and generate the digital twin of the first plant assembly station based in part on the vehicle product type.

15. The vehicle manufacturing plant of claim 13, wherein the at least one memory comprises further instructions that upon execution by the at least one processor, cause the at least one processor to:

20 receive the plant sensor data generated by the plant sensor system, the plant sensor data being associated with a location of at least one plant structure; and generate the digital twin of the first plant assembly station based in part on the location of the at least one plant structure.

16. The vehicle manufacturing plant of claim 13, wherein the at least one memory comprises further instructions that upon execution by the at least one processor, cause the at least one processor to:

receive the plant sensor data generated by the plant sensor system, the plant sensor data being associated with a location of at least one fixed asset of the first plant assembly station at the vehicle manufacturing plant; and generate the digital twin of the first plant assembly station based in part on the location of the at least one fixed asset of the first plant assembly station.

17. The vehicle manufacturing plant of claim 13, wherein the modification of the at least one asset comprises one of an asset orientation change, an asset location change, swapping a position of a first asset with a position of a second asset, an asset replacement, an asset addition, and an asset removal.

18. The vehicle manufacturing plant of claim 13, wherein one of the at least one component of the plant assembly station comprises station lighting, station equipment, and a station tool.

19. The vehicle manufacturing plant of claim 13, wherein the configuration of the first plant assembly station at the vehicle manufacturing plant is associated with a relocation of the first plant assembly station from a first location within the vehicle manufacturing plant to a second location within the vehicle manufacturing plant.

20. The vehicle manufacturing plant of claim 13, wherein the configuration of the first plant assembly station at the vehicle manufacturing plant is one of a configuration of a new plant assembly station and a reconfiguration of an existing plant assembly station.

* * * * *